UNITED STATES PATENT OFFICE.

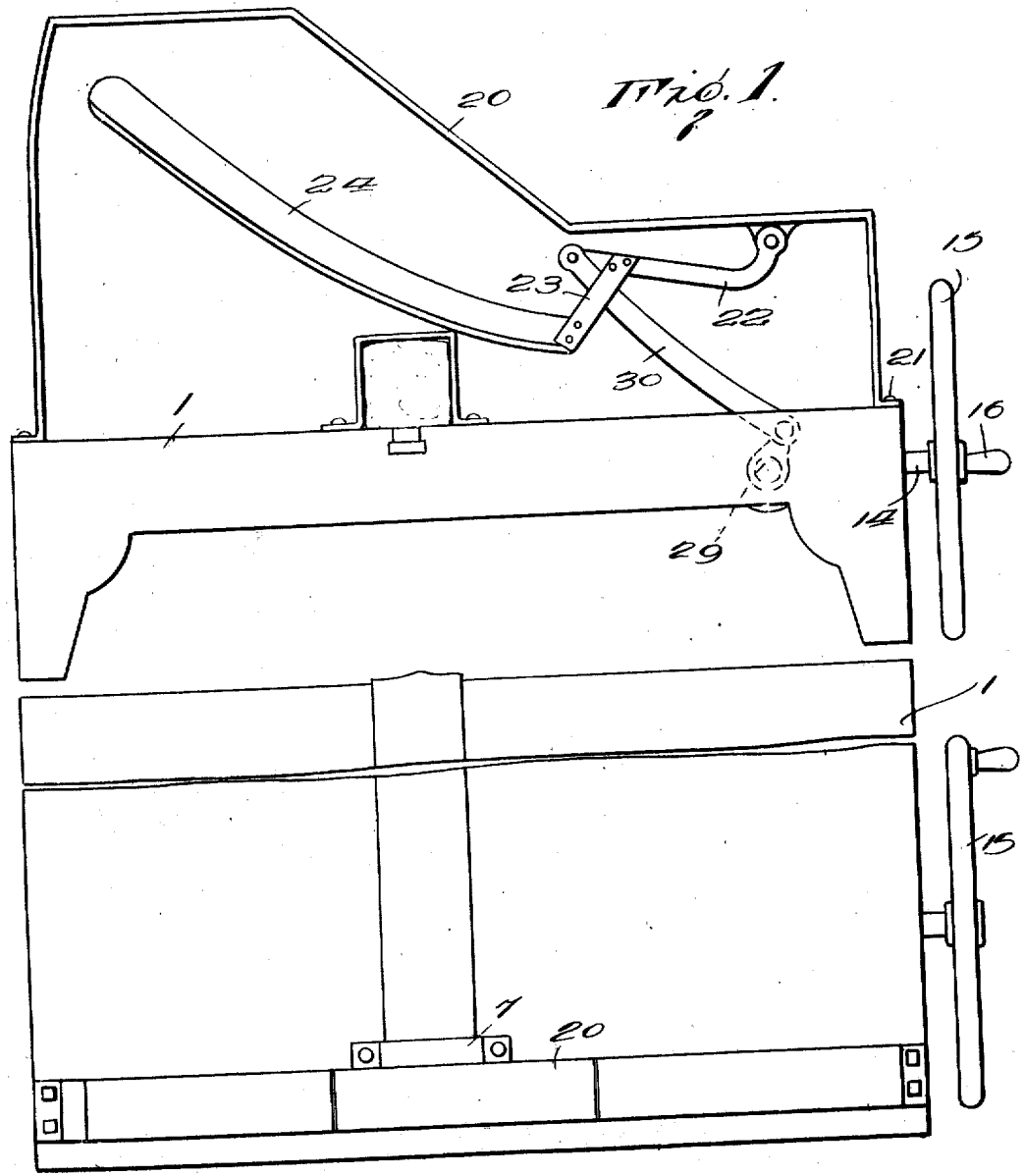

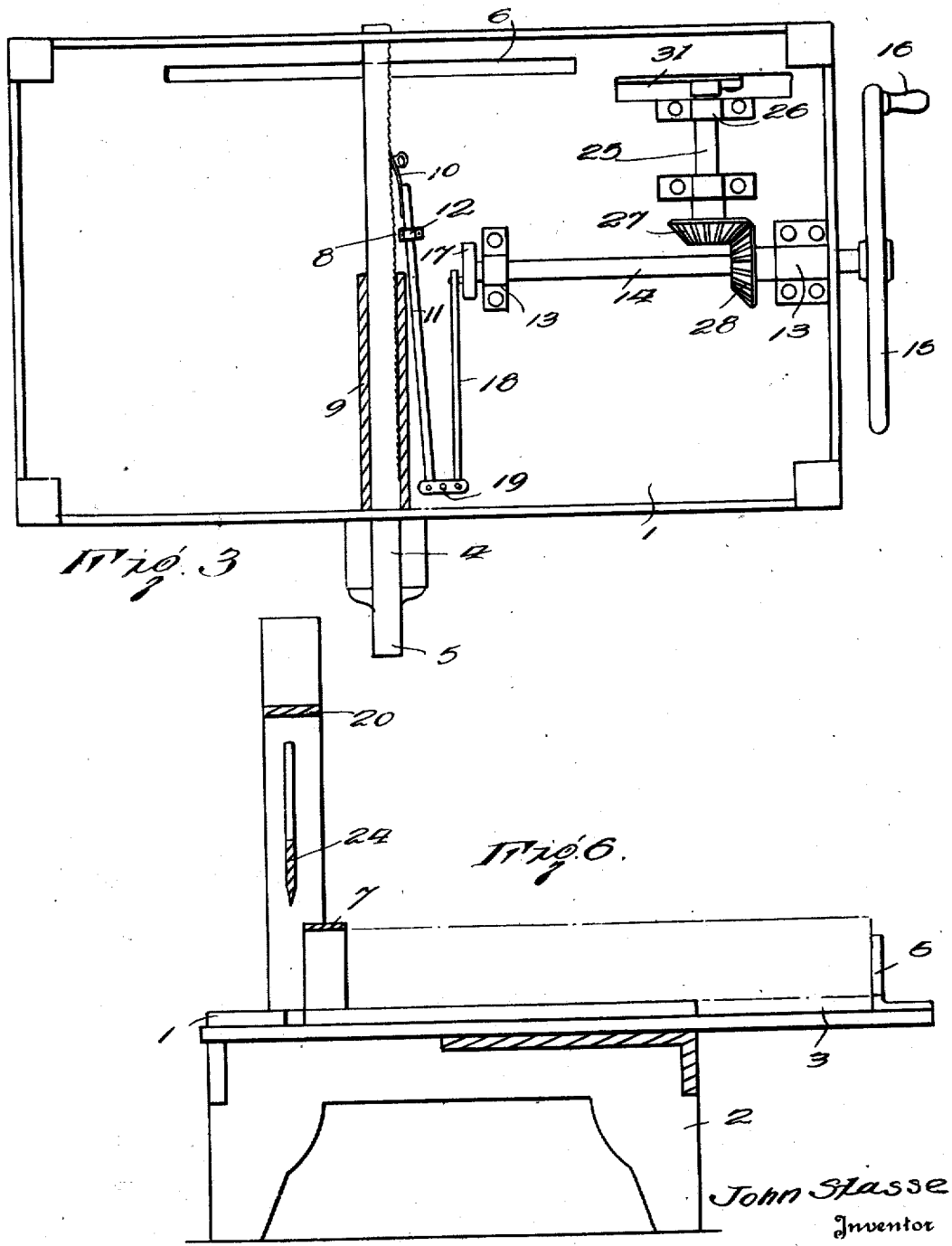

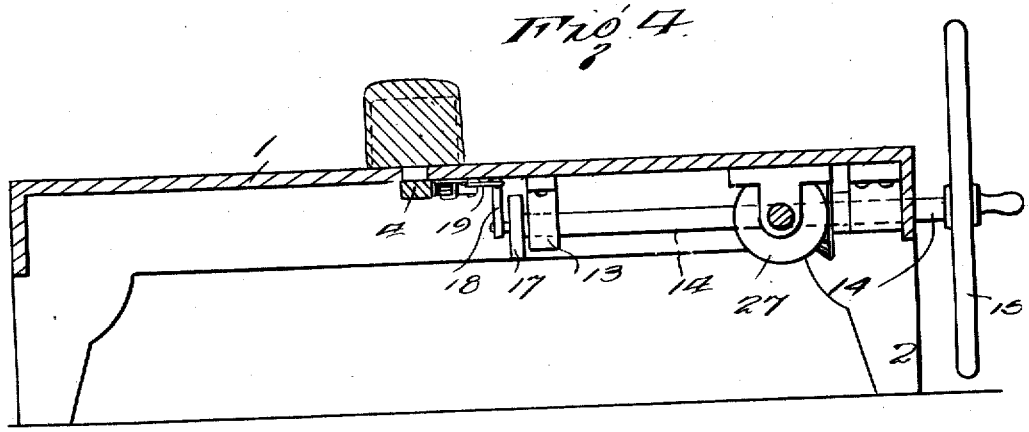
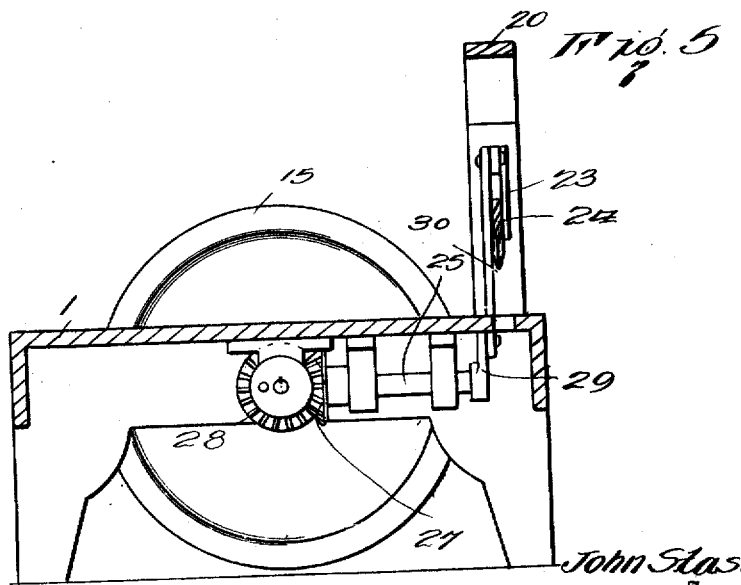

JOHN STASSE, OF LAPORTE, INDIANA.

BREAD-CUTTING DEVICE.

1,316,518.  Specification of Letters Patent.  Patented Sept. 16, 1919.

Application filed December 21, 1918. Serial No. 267,756.

*To all whom it may concern:*

Be it known that I, JOHN STASSE, a citizen of the United States, residing at Laporte, in the county of Laporte and State of Indiana, have invented certain new and useful Improvements in Bread-Cutting Devices, of which the following is a specification.

This invention relates to new and useful improvements in cutting devices, and the primary object of the invention is to provide a bread cutting mechanism that is adapted to cut a loaf of bread into a number of slices of predetermined size, upon the operation of a single operating means.

Another object of the invention is to provide a bread cutting device of this character that includes a bread carrying carriage that is slidable across a support, said support being provided with a cutting mechanism so that the bread will be cut into a number of slices as it is carried forward by movement of the carriage.

A further object of the invention is to provide a bread cutting device of this character that includes a support upon which is slidably mounted a forwardly reciprocable bread carrying carriage, and a cutting mechanism movable across the front of the support, and said parts are operable by a single means so connected therewith that the carriage reciprocating mechanism and the cutting mechanism are operable alternately.

Still a further object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:

Figure 1 is a front elevation of the device,

Fig. 2 is a top plan view thereof,

Fig. 3 is a bottom plan view of the device,

Fig. 4 is a longitudinal section thereof,

Fig. 5 is a transverse sectional view looking in one direction, and

Fig. 6 is a similar view looking in the other direction.

In describing my invention, I shall refer to the drawings in which similar reference characters designate corresponding parts throughout the several views.

The numeral 1 designates a substantially rectangular shaped support, which is in the form of a table provided with depending supporting legs 2 at the corners thereof. The support 1 has a transverse slot extending from the rear to the front edges thereof, and slidably mounted in said slot and movable across the support 1 is a bread carrying carriage 3 which is provided with an enlarged lower portion 4 disposed beneath the lower surface of the support 1. This bread carrying carriage has an upwardly bent bread engaging portion 5 on the rear end thereof, adapted for engagement with the rear end of a loaf of bread, as clearly shown in Fig. 6 of the drawings. The support 1 is provided adjacent its front edge with a knife receiving slot 6 for a purpose to be hereinafter more fully described. The support also has mounted thereon a bread guide 7 that is positioned over the slidable carriage 3 so as to guide the movement of a loaf of bread across the support when the carriage is reciprocated forwardly.

The lower portion 4 of the bread carrying carriage that is disposed beneath the lower surface of the support 1, has formed on one edge thereof a rack 8 and said carriage is guided in its movement by depending guides 9 that extend from the rear edge of the support 1 approximately half across the same. The rack formed on the carriage is adapted to be engaged by a spring pawl 10 that is secured to one end of a pawl carrying member 11 that is disposed substantially parallel with the lower portion of the carriage. This member 11 is slidably mounted through a supporting loop 12 secured to the lower surface of the support. It is obvious, that upon forward movement of the member 11 the pawl will force the carriage forwardly and upon the member 11 being withdrawn, the pawl will consequently slide back upon the rack for engagement with another tooth.

Extending transversely beneath the support 1 and supported in depending bearings 13, is a main operating shaft 14 that has one end projecting from the adjacent edge of the support, while the other extremity is positioned adjacent the rack side of the lower portion of the bread carrying carriage. This shaft 14 has mounted on its projecting end a fly wheel 15 provided with a handle 16 whereby the shaft is adapted to be rotated. The other end of the shaft 14 has a plate 17 thereon and connected with the outer face of said plate is a pitman 18 that extends substantially parallel with the pawl carrying member 11, said pitman and member having their free ends connected by a pivotally mounted connecting arm 19.

Secured to the upper face of the support 1 at the front edge thereof, is a supporting frame 20 that has its extremities connected as shown at 21 with the front of the support at the opposite sides thereof, and said frame has one side thereof disposed adjacent the fly wheel 15 lower than the other side, said first mentioned side having pivotally connected with the lower surface thereof an arm 22 that is bent angularly adjacent its pivotal connection and extends across the support as clearly shown in Fig. 1 of the drawings. This arm is connected adjacent its free end with a strap 23 carrying a knife 24 that is movable across the front of the support and down through the knife receiving slot 6 that is parallel with the front edge of the support. This knife 24 upon movement of the arm 22 will move across the bread so as to cut the projecting portion therefrom.

A short length shaft 25 is mounted in depending bearings 26 beneath the support 1 at right angles to the main drive shaft 14 and has one end connected therewith by a bevel gear 27 that is adapted to intermesh with the bevel gear 28 carried by the shaft 14. The opposite end of the shaft 25 has a crank 29 thereon, and connecting the free end of said crank with the end of the arm 22 is a connecting link 30 that extends upwardly through a slot 31 in the support adjacent the front edge thereof. Owing to this connection between the main drive and the knife upon rotation of the shaft 14, the knife will be moved across the front of the support to slice the bread.

In operation, when a loaf of bread is positioned on the bread holding carriage, upon rotation of the shaft 14 through movement of the wheel 15, it is obvious that the shaft 25 will be rotated and consequently owing to the connection of the knife 24 therewith, the knife will be swung vertically beneath the frame 20 across the front of the support, so as to cut the bread on the carriage. When a slice has been cut the knife is once more lifted to inoperative position as clearly shown in Fig. 1 of the drawings, and the rotation of the shaft 14 will then move the pitman 18 that is connected with the extremity of said shaft, which movement will rock the connecting arm 19 to project the pawl carrying member 11 forwardly. The pawl is then in engagement with the rack on the lower portion of the carriage 13 and will consequently reciprocate the said carriage forwardly to project a predetermined quantity of bread in the path of movement of the knife upon the next downward operation thereof.

By this construction and arrangement, the carriage moving mechanism and the cutting mechanism are adapted to move alternately so as to rapidly slice the bread as it is ejected across the support. It is only necessary to continue to rotate the wheel 15 to entirely slice the loaf of bread which will be ejected and cut automatically by this device. A single drive means is employed to accomplish this double operation and said means is so connected with the cutting and ejecting mechanism and its operation will move the same alternately to accomplish the results hereinbefore stated.

From the foregoing description taken in connection with the accompanying drawings it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim is new, and desire to secure by Letters Patent, is:

1. A bread cutting device including a supporting plate, a supporting frame secured thereto, a pivoted cutting blade carried adjacent one terminal of the supporting frame, the opposite terminal portion of the frame being extended to provide a guard for the blade accommodating vertical swinging movement thereof, a main operating shaft, and driving connections between said shaft and said blade.

2. A bread cutting device including a supporting plate, a supporting frame secured thereto, an arm having an angular terminal pivotally secured to the supporting frame, a main operating shaft, an operating link connecting said shaft with the opposite terminal of said arm, an angularly directed stop secured to said arm intermediate its ends, and a cutting blade carried by said stop, a portion of the supporting frame being extended to provide a guard for the blade accommodating vertical swinging movement thereof.

In testimony whereof I affix my signature hereto.

JOHN STASSE.